UNITED STATES PATENT OFFICE.

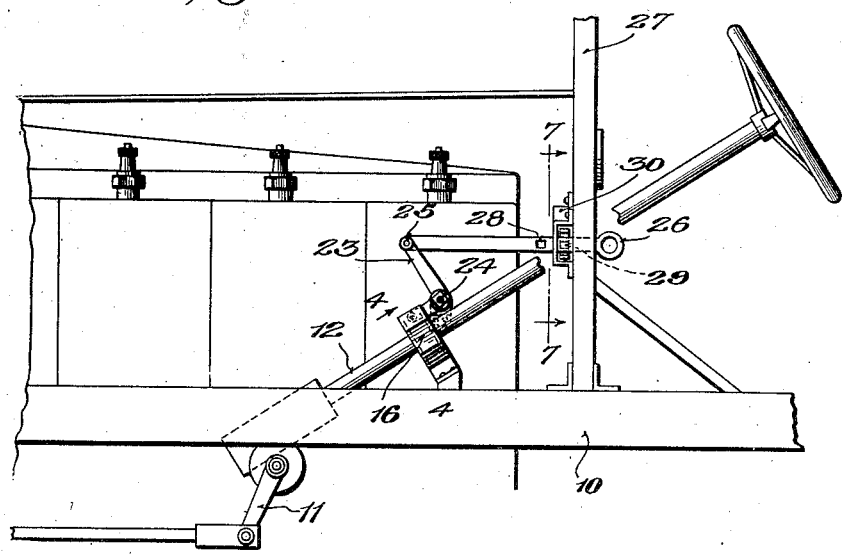
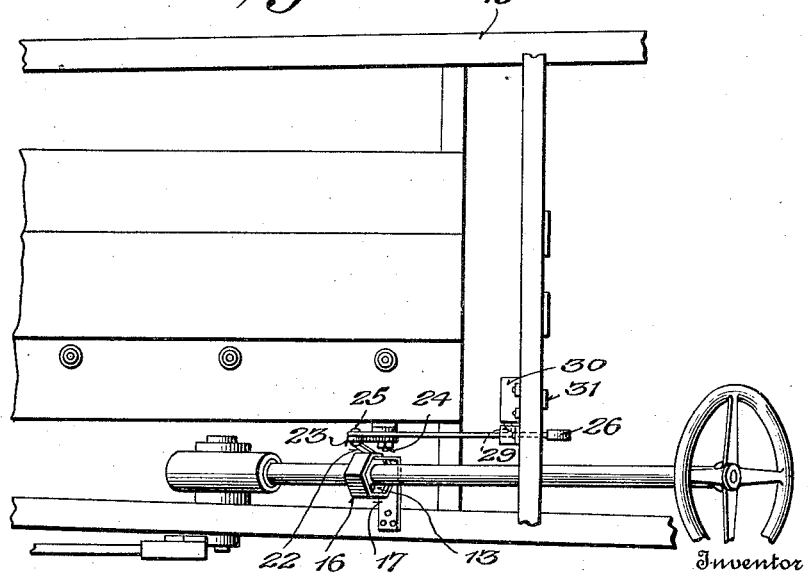

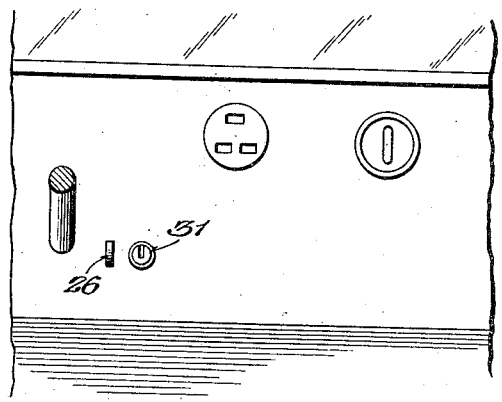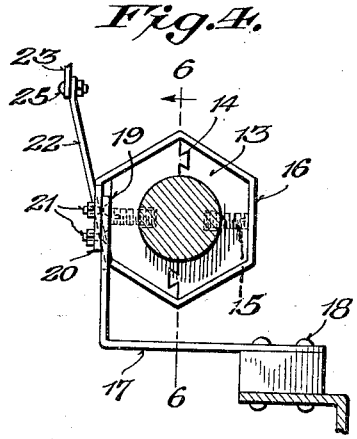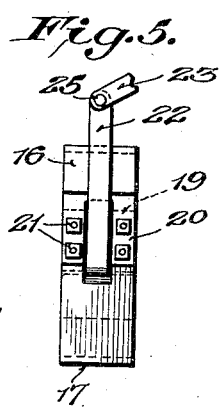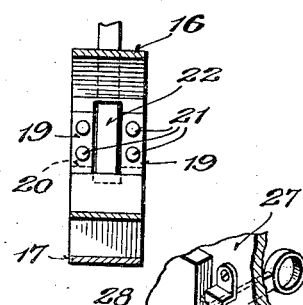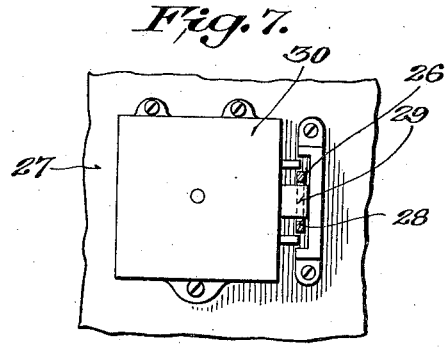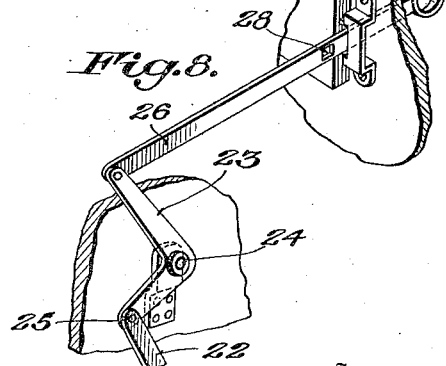

WILLIAM S. PORTLOCK, SR., OF NORFOLK, VIRGINIA.

LOCK FOR AUTOMOBILES.

1,427,323.

Specification of Letters Patent.   Patented Aug. 29, 1922.

Application filed November 30, 1920.   Serial No. 427,378.

*To all whom it may concern:*

Be it known that I, WILLIAM S. PORTLOCK, Sr., a citizen of the United States, residing at Norfolk, in the county of Norfolk and State of Virginia, have invented new and useful Improvements in Locks for Automobiles, of which the following is a specification.

This invention relates to locking devices, and, more particularly, to a device intended, primarily, to serve as a lock for the steering mechanism of an automobile.

The invention has as its object the provision of a strong and simple locking device which may readily be applied to an automobile steering mechanism by one who is not a skilled mechanic.

The above and other objects of the invention, which will become obvious as the description proceeds, are attained by the provision of a mechanism comprising, broadly, a steering post binding member, preferably in the form of a contractible spring band, means operable from the driver's seat for contracting the band about the steering post, and a lock for maintaining the band contracting means in fixed position when it is moved to contract the band, and thereby to bind the steering post.

In the accompanying drawings there is illustrated one form of a device in which the invention may be embodied, and in these drawings:—

Fig. 1 is a side elevational view of a motor vehicle showing a portion of the steering mechanism with the locking device applied thereto, Fig. 2 is a plan view of the device shown in Fig. 1, Fig. 3 is an end view looking to the left in Fig. 1.

Fig. 4 is a cross section taken on the line 4—4 of Fig. 1.

Fig. 5 is a side elevational view of the spring band and a portion of its operating mechanism, Fig. 6 is a view of the interior of the spring band shown in Fig. 5, but taken on a line indicated by the line 6—6 in Fig. 4, Fig. 7 is a view taken on the line 7—7 of Fig. 1, and Fig. 8 is a perspective showing a portion of the band contracting mechanism.

Referring to the drawings more in detail, 10 indicates, generally, the forward part of a motor vehicle having a steering mechanism 11, which comprises a rotatable steering post 12. At any suitable point along the post there may be fixedly secured to the same an angularly shaped member 13, shown in the drawings as a hexagonal disk centrally bored so as to encircle the steering post, and positioned at a point within the engine hood. The disk 13 should be of a character which will permit its application to the steering post without in any way disassembling the steering mechanism. For this reason it is shown in the drawings as being formed in two parts, dovetailed together at 14 and held in fixed position on the steering post as by means of set screws 15 passing through each section of the disk from its peripheral surface and into the steering post.

Around the angular disk 13 is positioned a binding member which, preferably, is in the form of a contractible spring band 16, which also may be bent to a hexagonal shape, and may be supported in position by an L-shaped bracket 17. The supporting bracket is secured to any stationary portion of the vehicle, as by bolts or rivets 18, and the short arm of the same has a forked end 19, the fingers of which coincide with and are secured to the fingers 20 at one end of the spring band by bolts or other securing means 21. From this fixedly secured forked end the band extends around the hexagonal disk and has its other free end formed with an elongated finger 22 extending through the opening between the complemental fingers upon the bracket and band.

The band may be formed so as to be normally in the position shown in Fig. 2, in which position it permits the free rotation of the steering post. It will be apparent that a pull applied to the free end 22 of the band will cause a contraction of the band about the steering post and the consequent binding of the post.

Any suitable means may be employed for causing this contraction of the band, but in the accompanying drawings I have indicated means operable from the driver's seat and comprising a bell crank 23 fulcrumed at 24 and having its short arm pivotally secured at 25 to the end 22 of the spring band. To the long arm of the bell crank is pivotally connected a reciprocable operating rod 26 extending through the dash 27 of the machine and having an opening 28 therein, through which opening may pass the bolt 29 of a lock 30 secured to the dash of the machine.

The opening 28 is positioned in the operating rod so that the bolt of the lock will pass therethrough only when the rod is drawn rearwardly so as to move the bell crank 23 and thereby contract the band about the steering post. The lock may be operated through a key hole 31 which may be reached from the driver's seat, and may be of the ordinary type shown in the views, or may be a permutation lock when desired.

The operation of the locking mechanism will be obvious from the preceding description of the mechanical construction of the embodiment shown in the drawings. The binding band 16 will normally be in the expanded condition shown in Fig. 2, permitting the steering post to be freely rotated. When the vehicle is stopped and it is desired to lock the same, the rod 26 is grasped by its handle and pulled rearwardly until the opening 28 is positioned in front of the bolt, whereupon the bolt will be projected into the opening and the steering post will thus be locked. When it is desired to release the locking mechanism the key 31 is turned to retract the bolt, and the band 16, in expanding, will swing the bell crank 23 about its pivot and withdraw the opening 28 in the rod 26.

It will, of course, be understood that the entire mechanism shown in the views as positioned within the engine hood should preferably be encased so that it may not be tampered with. Obviously, many modifications might be made in the structure shown in the drawings without departing from the scope of the invention, which is not limited to the exact positioning of the mechanism shown, or to the details of construction, but might readily be varied as may appear to be desirable to one skilled in the art.

I claim:

1. The combination with a vehicle steering mechanism comprising a rotatable post of an angularly shaped split nut fixedly secured to said post, a contractible spring-metal band encircling said nut having one end held in fixed position and the other end free, said band being normally expanded to permit rotation of said post, a bell-crank lever having one arm connected to the free end of said band, a reciprocable operating rod operable from the driver's seat and connected to the other end of said lever, a lock, and means on the operating rod adapted to be engaged by the lock bolt to hold the operating rod in fixed position when it is moved to cause the band to bind the post, said band self-releasing said post when the lock bolt is thrown to release said rod.

2. A locking device for the steering mechanism of a vehicle comprising an angularly shaped member adapted to be fixedly secured upon a steering post without removing the post, a contractible spring-metal band adapted to be positioned around said member with one end in fixed position and the other end free, the member being normally movable when said band is in expanded position, means for contracting said band comprising a bell-crank lever and a reciprocable rod, and a lock having a bolt adapted to engage said rod to hold the band in contracted condition, said band self-releasing said member when the lock bolt is disengaged from said rod.

3. The combination with a vehicle steering mechanism comprising a rotatable post, of an angularly shaped member adapted to be fixedly secured upon said post without removing the post, a contractible band positioned around said member with one end in fixed position and the other end free, a bell-crank lever having one arm connected to the free end of said band, a reciprocable operating rod connected to the other end of said lever and operable from the driver's seat to cause the band to grip said enlargement and thereby to bind the post, a lock, and means upon the operating rod adapted to be engaged by the lock bolt to hold the rod in fixed position when it is moved to cause the band to bind the post.

In testimony whereof I have hereunto set my hand.

WILLIAM S. PORTLOCK, Sr.